(12) United States Patent
Mathews et al.

(10) Patent No.: US 9,016,711 B1
(45) Date of Patent: Apr. 28, 2015

(54) TRAILER WITH TRAILER HITCH

(71) Applicants: Kendall Mathews, Memphis, TN (US); James Hieronymus, Springfield, MO (US); John J. Landree, Memphis, TN (US); Gene William Folsom, Palmdale, CA (US)

(72) Inventors: Kendall Mathews, Memphis, TN (US); James Hieronymus, Springfield, MO (US); John J. Landree, Memphis, TN (US); Gene William Folsom, Palmdale, CA (US)

( * ) Notice: Subject to any disclaimer, the term of this patent is extended or adjusted under 35 U.S.C. 154(b) by 0 days.

(21) Appl. No.: 14/061,225

(22) Filed: Oct. 23, 2013

Related U.S. Application Data (60) Provisional application No. 61/717,747, filed on Oct. 24, 2012.

(51) Int. Cl.
*B62D 13/04* (2006.01)
*B60D 1/54* (2006.01)

(52) U.S. Cl.
CPC .......... *B62D 13/04* (2013.01); *B60D 2001/546* (2013.01)

(58) Field of Classification Search
CPC ... B62D 13/00; B62D 13/04; B60D 2001/546
USPC ............... 280/442, 443, 444, 445, 492, 491.5
See application file for complete search history.

(56) References Cited

U.S. PATENT DOCUMENTS

| | | | | |
|---|---|---|---|---|
| 3,105,704 A * | 10/1963 | Schramm | ....................... | 280/443 |
| 4,345,775 A * | 8/1982 | Merrifield | ...................... | 280/443 |
| 4,720,119 A * | 1/1988 | Ritter | .............................. | 280/443 |
| 5,244,226 A * | 9/1993 | Bergh | ........................... | 280/442 |
| 5,579,228 A * | 11/1996 | Kimbrough et al. | ............ | 701/41 |
| 6,273,446 B1 * | 8/2001 | Paul | .............................. | 280/448 |
| 7,273,217 B2 * | 9/2007 | Rudder et al. | ........... | 280/86.751 |
| 8,360,457 B2 * | 1/2013 | Timmons, Jr. | ................ | 280/445 |
| 2005/0046146 A1 * | 3/2005 | Plante | ........................ | 280/460.1 |
| 2010/0181743 A1 * | 7/2010 | Timmons, Jr. | ................ | 280/442 |

* cited by examiner

*Primary Examiner* — Kevin Hurley
(74) *Attorney, Agent, or Firm* — Stephen J. Stark (57) ABSTRACT

A trailer having a hitch assembly, intended to be used with a receiver on the towing vehicle, enables the vehicle/trailer pair to back up easily by locking the trailer's orientation relative to the towing vehicle. The vertical pivot axis (yaw) may be locked while the lateral (pitch) and longitudinal axes (roll) may remain free to rotate to allow for bumps and dips in the road. Furthermore a steerable suspension can be provided for many embodiments such as with an actuator receiving a signal from the back up wiring of the vehicle to change the mechanical constraints of the steering system upon receipt of the signal (such as to lock the position of a first tie rod connecting the wheels to the frame while freeing another, and possibly altering the angle of the wheels relative to the frame in the process). Meanwhile a toe-in effect of the wheels can be achieved by using multiple tie rods with a front tie rod bent rearwardly towards a rear tie rod.

4 Claims, 11 Drawing Sheets

TRAILER WITH TRAILER HITCH

CLAIM OF PRIORITY

This application claims the benefit of U.S. Provisional Patent Application No. 61/717,747 filed Oct. 24, 2012, which is incorporated in its entirety herein by reference.

FIELD OF THE INVENTION

The invention generally relates to the field of automotive trailers and receiver hitches.

DESCRIPTION OF THE RELATED ART

Common trailers use a ball shaped hitch to allow relative motion between the towing vehicle and the trailer during maneuvering. The freedom of the trailer in three axes creates a challenge to backing up the vehicle/trailer pair. If the vehicle and the trailer are not aligned, then the direction of travel for the vehicle/trailer pair is limited during backing. An example could be a situation where the vehicle turned to the left to enter a parking space in a parking lot. With the vehicle fully in place, the trailer may or may not have come completely behind the vehicle. If the trailer is still at an angle relative to the vehicle, then the driver is forced to back out of the parked position in the same direction entered. If the desire is to back out the opposite direction then there are not normally options for this maneuver. Common trailers carry the majority of the load on their own axle and limit the weight applied to the bumper/receiver of the towing vehicle. For small loads and light weight use, small platforms are frequently used which are rigidly inserted into the receiver of the host vehicle. These platforms have the advantage of allowing for easy maneuvering and backing but have the inherent limitation of light load limits since the entirety of the load is carried by the host vehicle.

For instances where the load is heavy yet still relatively small, a need exists to enable a small trailer to be used which carries the entire load on its own axles yet is constrained to follow directly behind the towing vehicle by separating the three axes of rotation and limiting one of those axes, thus making it quite easy to park the vehicle in tight spaces and back out in either direction desired. Such a trailer construction is not known to exist by the applicant.

Accordingly, a need exists for an improved trailer construction for use with vehicles.

SUMMARY OF THE INVENTION

It is an object of many embodiments of the present invention to provide an improved trailer and/or trailer steering system for use with trailers.

It is yet another object of many embodiments of the present invention to provide a trailer configuration wherein at least the yaw, or vertical pivot axis may be locked while still providing turning capability of the trailer.

Accordingly, in accordance with a presently preferred embodiment of the present invention, the three axes of rotation of the trailer relative to a towing vehicle may be separated and, for many embodiments, preferably controlled independently. The vertical pivot axis (yaw) may be locked through the use of a receiver collar which may be preferably inserted rigidly into, or relative to, the towing vehicle. The longitudinal pivot axis (roll) may remain free to rotate since the rear portion of the hitch collar for many embodiments may be round and may be inserted into a round collar on the trailer. The lateral axis (pitch) may remain free to rotate for many embodiments since the preferably round collar on the trailer may pivot up and down on its mount.

An additional benefit to enable vehicles of various sizes or hitch heights may be to offset the round portion of the receiver tang from the square portion and/or also to offset the pivot point of the trailer collar from its rotation axis. When either the receiver tang or the trailer collar is inverted the relative height of the hitch assembly from the ground can be adjusted to at least attempt to match the height of the receiver on the towing vehicle for at least some embodiments.

When a trailer is secured behind the towing vehicle with a rigid yaw axis the trailer tires will normally undergo side loads based on their relative distance behind the towing vehicle's rear tires compared to the distance from the front to the rear tires of the towing vehicle. This side load is due to the fact the towing vehicle rear tires do not rotate or steer so the entire system pivots about that point. For a trailer mounted as described, the tires would normally traverse a larger radius arc than the towing vehicle rear tires and will subsequently experience side loads relative to the ratio of the arc radius difference. When a vehicle stops during a turn and begins to back up in the opposite direction of turn (i.e. "three point turn") the trailer tires instantly experience side loads in the opposite direction. To prevent side loads and the likely subsequent wear of the tires, it would appear to be advantageous to steer the tires of the trailer; however the steering system must be capable of transitioning the trailer from one direction turn to the other without solely relying on the motion of the towing vehicle, as in the three point turn example described above.

The applicant has an optional steering system which improves the steering of trailers towed behind a vehicle for many embodiments.

Preferred embodiments of the applicant's design embodies a trailer where the steering may be laid out as a trailing link caster type system with both tires connected via a forward and a rear lateral tie rod. For forward operations, the forward tie rod may be held rigid for some embodiments while the rear tie rod may be allowed to translate left and right as the tires pivot about the forward tie rod attach points. For reverse operations the rear tie rod may be held rigid for some embodiments while the forward tie rod is allowed to translate left and right as the tires pivot about the rear tie rod attach points.

At the point of transition from forward to reverse operations, a motor or other device may preferably be employed to quickly center the offset tie rod and secure it for some embodiments, while releasing the rigidly held tie rod, thus allowing the trailer to begin translations. Once in either forward or reverse state, the trailing link castering tires are preferably able to follow the necessary curvature passively, avoiding any side loads and minimizing tire wear. Described herein as an electro-hydraulic motor, the steering system may employ a spring loaded "Vee-Groove" clamp that may be forced forward by springs or aft by the hydraulic piston attached to the motor. The vee-groove clamp may interface with either or both of the forward or rear tie rod to center and secure it, or release it, as determined by its position. Other mechanisms may be employed with other embodiments.

BRIEF DESCRIPTION OF THE DRAWINGS

The particular features and advantages of the invention as well as other objects will become apparent from the following description taken in connection with the accompanying drawings in which.

DETAILED DESCRIPTION OF THE DRAWING

Figure 1:
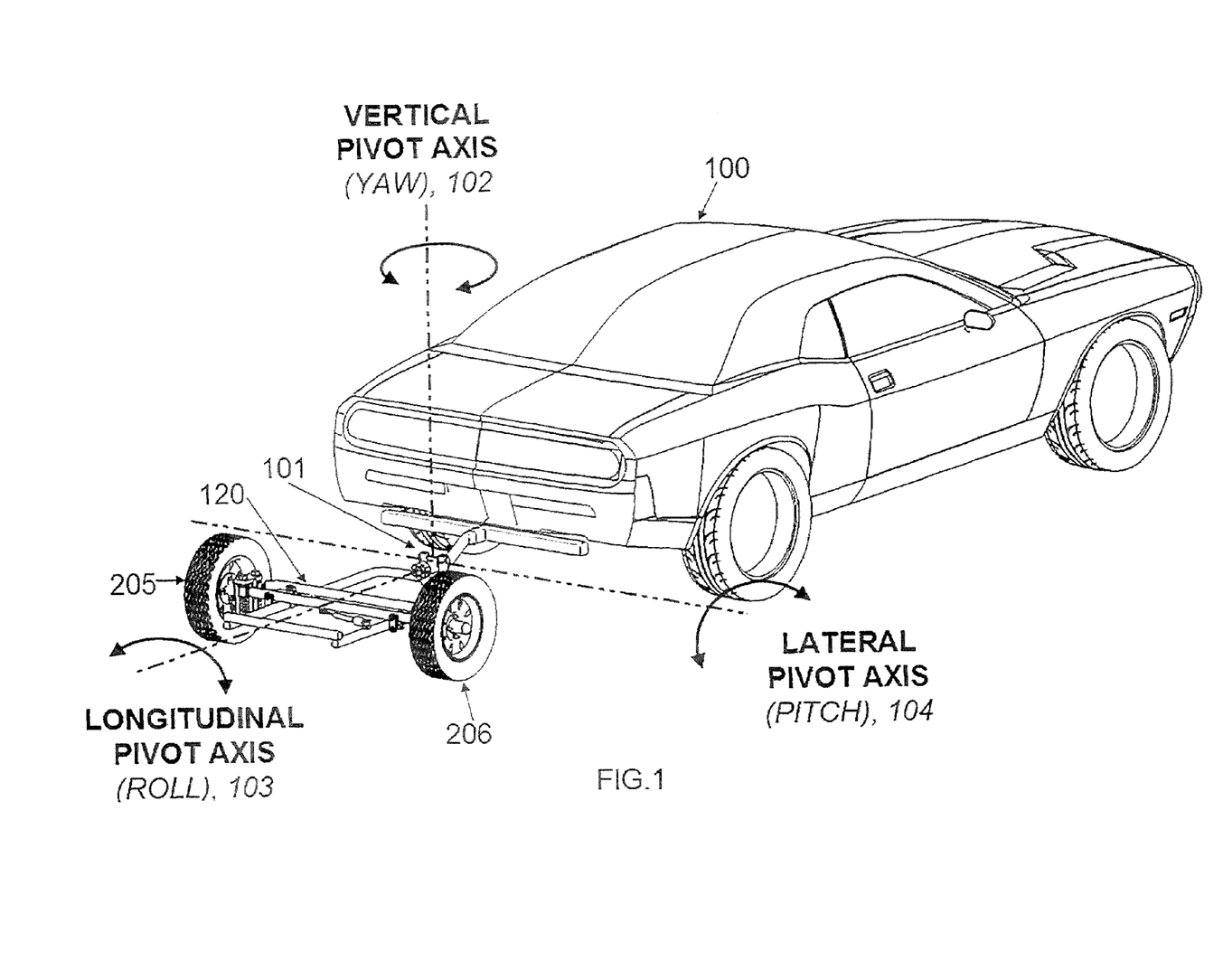
FIG. 1 is a perspective view of a presently preferred embodiment which shows a representative vehicle with a small trailer of a presently preferred embodiment of the present invention depicting the three primary axes of rotation of the trailer relative to the vehicle.

An automobile is shown in FIG. 1. The vehicle 100 has a trailer 120 attached with a hitch assembly 101 and the three primary axes of motion between the vehicle and the trailer at the interface of the trailer 120 and vehicle 100 at the hitch assembly 101 are illustrated. The vertical pivot axis 102 shows yaw motion. The longitudinal pivot axis 103 shows roll motion. The lateral pivot axis 104 shows pitch motion.

Figure 2:
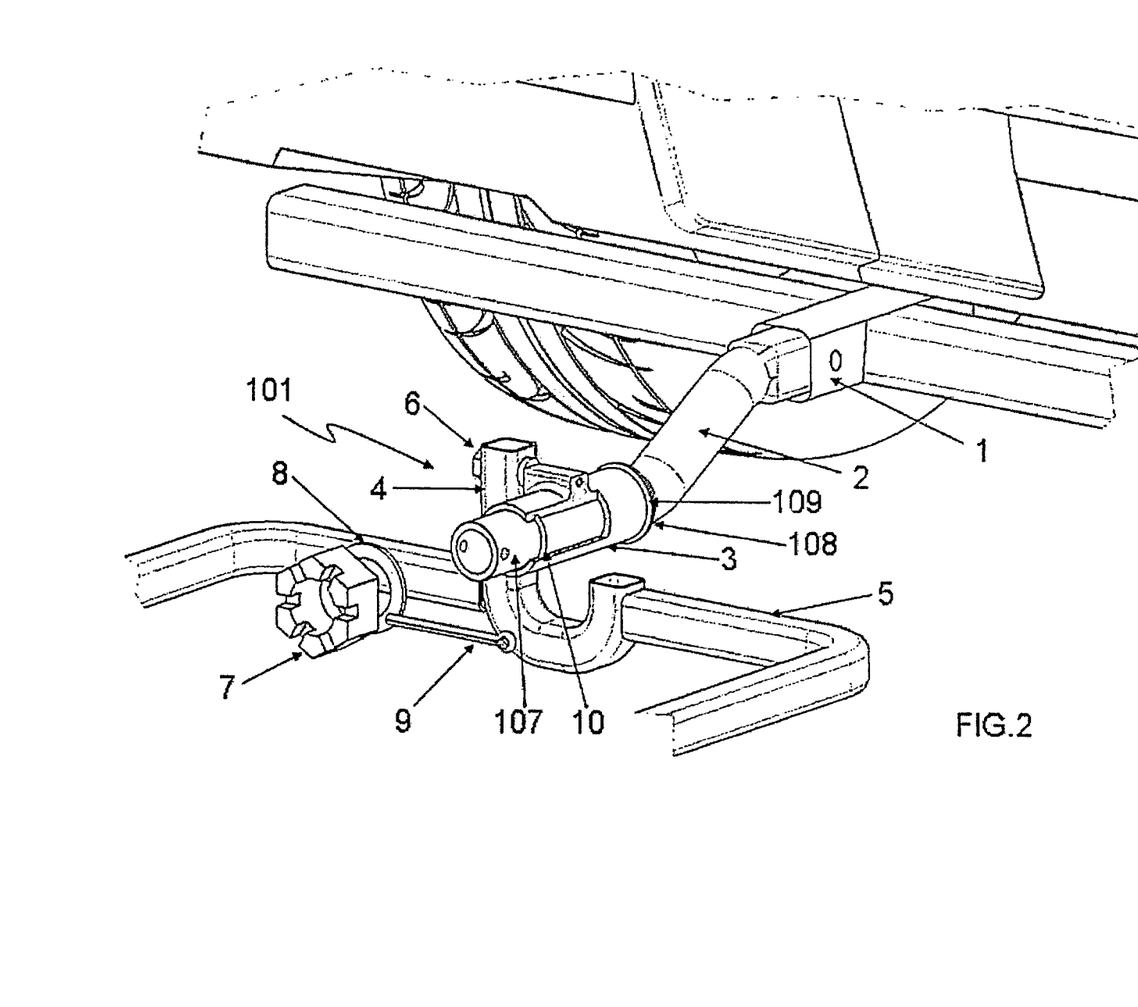
FIG. 2 is a perspective, exploded, and partial cross-section view of a presently preferred embodiment of FIG. 1 which shows detail of the receiver tang inserted into a vehicle and shows detail of the interface between a receiver tang and a round collar on a trailer.

In FIG. 2 shows detail of a receiver hitch 1 connected to the vehicle 100 is shown on the rear end of the vehicle 100, into which the trailer tang 2 of the hitch assembly 101 is inserted for many embodiments. The trailer tang 2 may be designed such that its square front segment 105 fits within standardized receiver hitch geometries. The mid segment 106 of the tang 2 preferably transitions from square to round as well as provides an offset in the centerline axis between the first and third segments 105,107 of the tang 2. The third segment 107 of the tang 2 may be round with a flange 108 on the forward edge to provide for thrust constraint. The third segment 102 of the tang 2 may be then inserted into the trailer collar 3 which allows for rolling motions of the tang 2 within the machined round portion of the collar 3 and smooth quite operation may be provided using an o-ring 10 which may be secured in a groove on the inner diameter of the collar 3. The collar 3 may then be attached to the trailer U-frame 4 which may be an integral part of the trailer frame 5 at mount 18. Other connections may be used with other embodiments.

The collar 3 may be mounted using shoulder bolts 6 (near side bolt not shown for clarity) in FIG. 2 extending into mount 18. With the tang 2 fully seated having its thrust flange 108 against the forward edge 109 of the collar 3, a washer 8 and nut 7 may then be screwed onto the threaded end of the third segment 107 of the tang 2. Once in place, the nut 7 may be secured with a cotter pin 9 and/or other connector. Other hitch assemblies 101 used with other embodiments may be constructed differently and/or provide other features.

Figure 3:
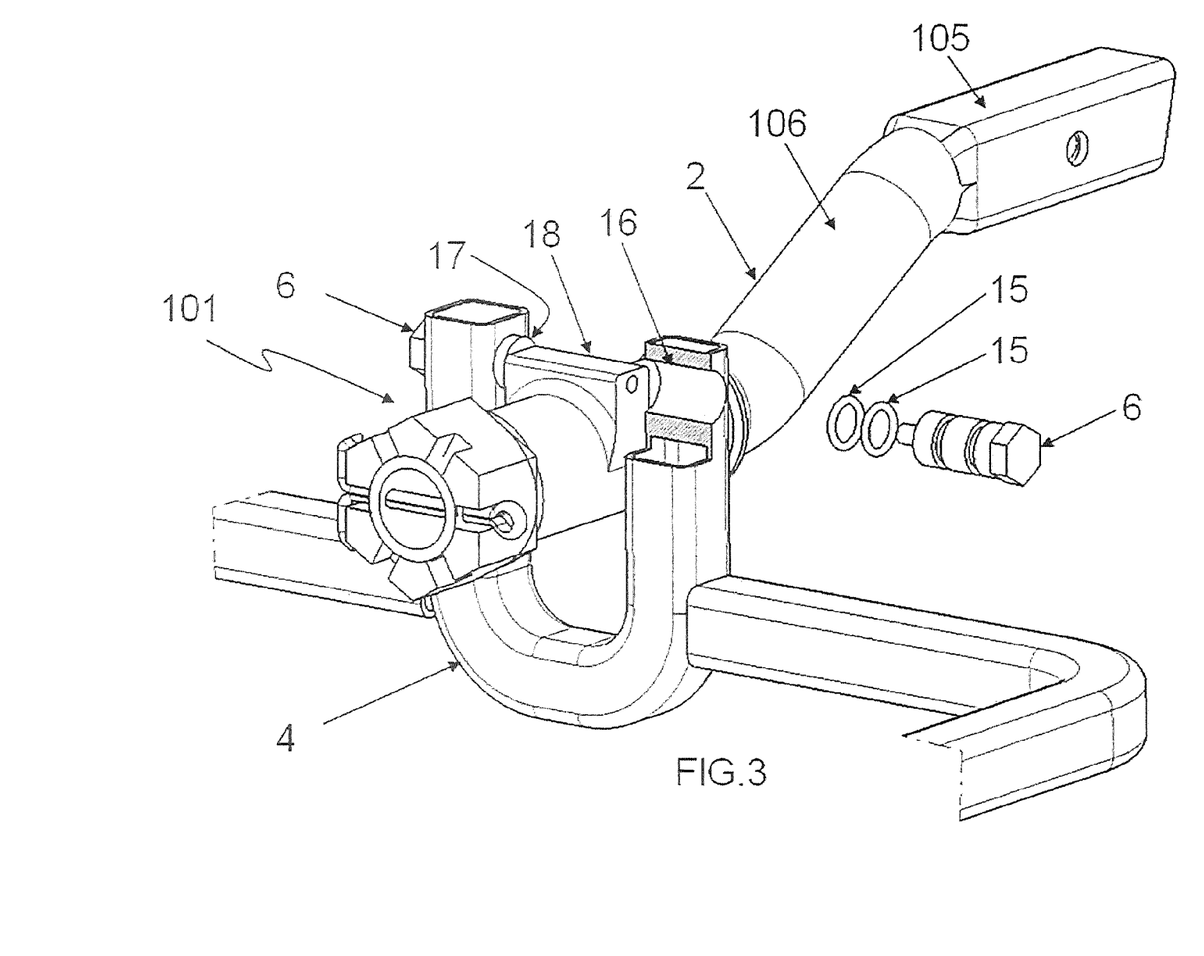
FIG. 3 is a perspective, exploded, and partial cross-section view of the embodiment of FIG. 2 which shows detail of the interface between the round trailer collar and its mount to the trailer yoke.

In FIG. 3 the trailer tang 2 has already been secured to the trailer collar 3. The collar may be attached to a support, illustrated as a U-frame 4 or other support, using two shoulder bolts 14, each of which may be inserted through two smooth bore holes 16 in the U-frame 4 and screwed into the threaded top section or mount 18 of the collar 3. Smooth quiet operation may be provided by securing two o-rings 15 into grooves in each shoulder bolt 14 as well as between the U-frame 4 and the collar 3 shown as O-ring 17, the other being taken out for the cut-away view. Other connections may be used with other embodiments.

Figures 4A, 4B:
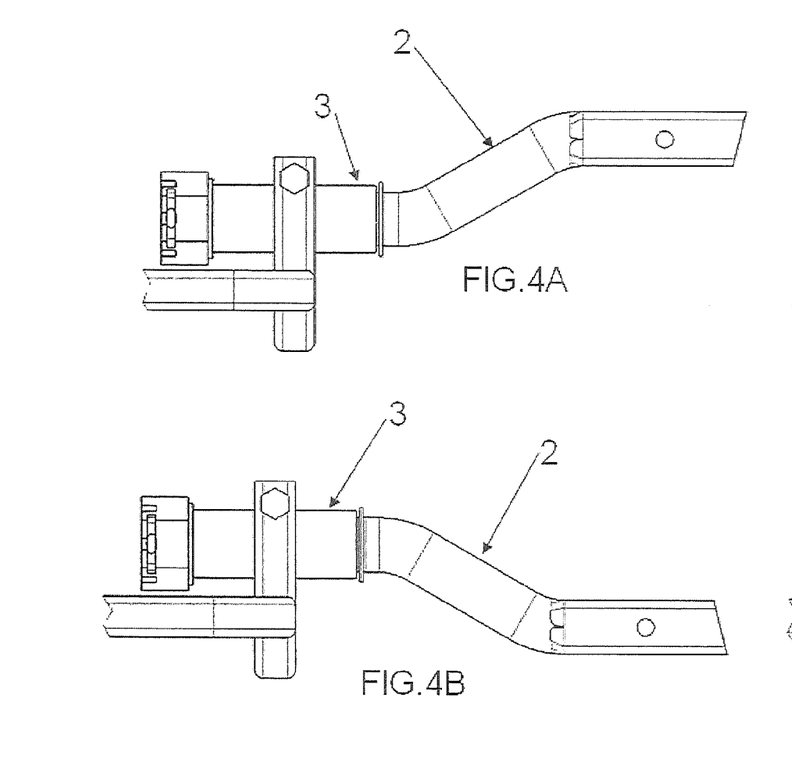
FIGS. 4A-4D shows side plan view of four mounting configurations for the embodiment of FIGS. 1-3 which allow for interfacing with vehicles of various hitch heights.
Figures 4C, 4D:
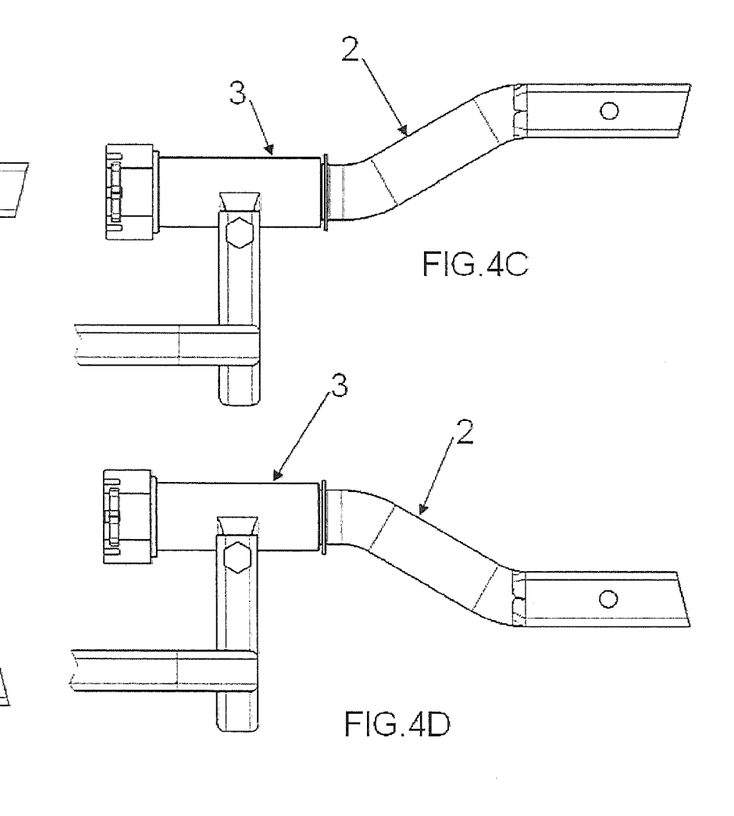

FIGS. 4A-4D depict four alternate mounting configurations of the collar 3 and of the trailer tang 2 yielding ever increasing mounting heights of the tang 2, relative to the ground below to accommodate various hitch assembly 101 mount heights which may be advantageous for many embodiments. Some embodiments may or may not provide this mounting alternative capabilities of the hitch assembly 101 for the tang 2 to be connected relative to the collar 3 which may be accomplished by locating the mount 18 on an exterior surface of the collar 3 and then selecting whether to locate the mount 18 on the top of the collar 3 as illustrated in FIGS. 2 and 3 (and FIGS. 4A and 4B) or locate the mount 18 on the bottom of the collar 3 as shown in FIGS. 4C and 4D.

Thus there has been described a trailer hitch assembly 101 that significantly eases the skill required to back up by locking the vertical pivot axis 102 and thus locating the trailer 120 always directly behind the towing vehicle 100 which has been found effective for many embodiments.

Figure 5A:
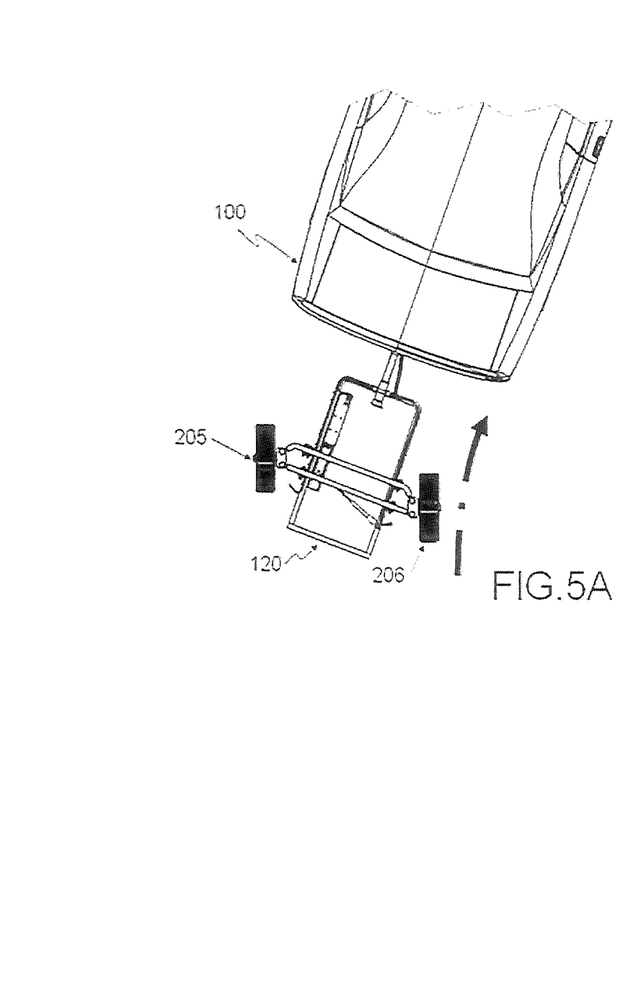
FIGS. 5A-5B show top plan views of a preferred embodiment having reverse direction compensating caster steering, showing the relative trailer tire orientation as a vehicle has began to turn right in FIG. 5A and again as it is about to back up, to the left, into a driveway or parking spot in FIG. 5B. These views depict a perceived need for the trailer tires to center and transition to the reverse condition without relying solely on vehicle motion for at least some embodiments.
Figure 5B:
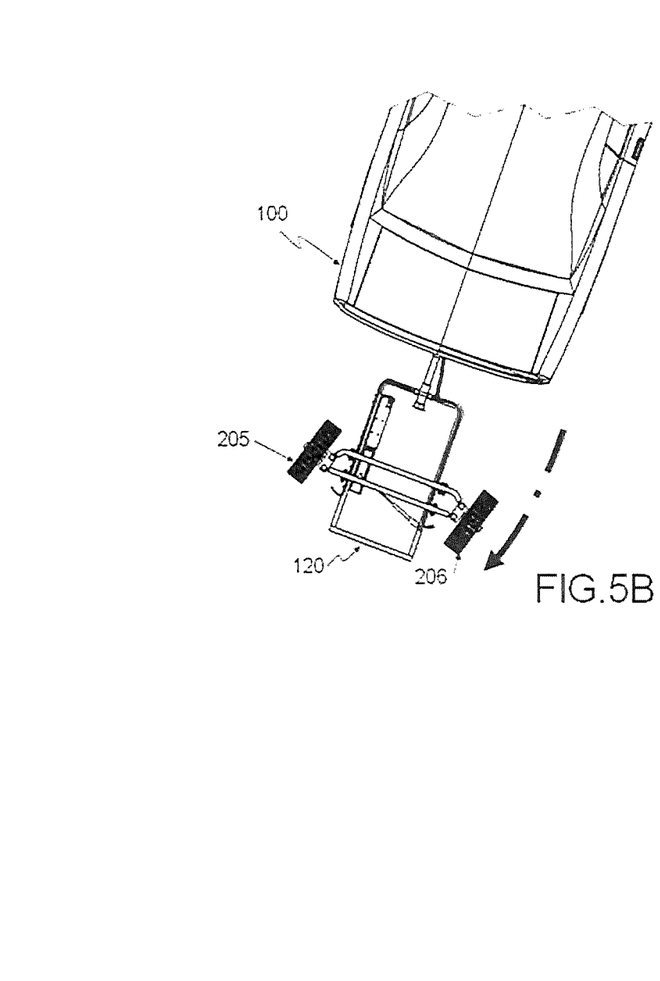

In FIG. 5A, a towing vehicle 100 has driven past the intended parking location (lower left of views). As is typical, the towing vehicle 100 has initiated a right turn while travelling forward which then drew the steering system, in forward mode, to trail the vehicle 100 and have the tires 205,206 turned to the left, relative to the trailer 120. In the right view, the towing vehicle 100 has placed the selector in reverse, engaging the backup light electrical circuit or other system, which may then engage the reverse steering system utilized with many embodiments as will be described in detail below on the trailer 120. This action preferably centers the tires 205, 206 by aligning them parallel to the trailer frame and then releases the steering system in the reverse mode allowing the tires to rotate toward the direction of reverse travel as shown in FIG. 5B; (in this case to the left) the same direction as those at the front of the vehicle 100 (not shown), but as would be understood by those of ordinary skill in the art. Other embodiments may drive the wheels and tires 205,206 to the at least a somewhat similar relative position as the front wheels of the vehicle 100.

Figure 6:
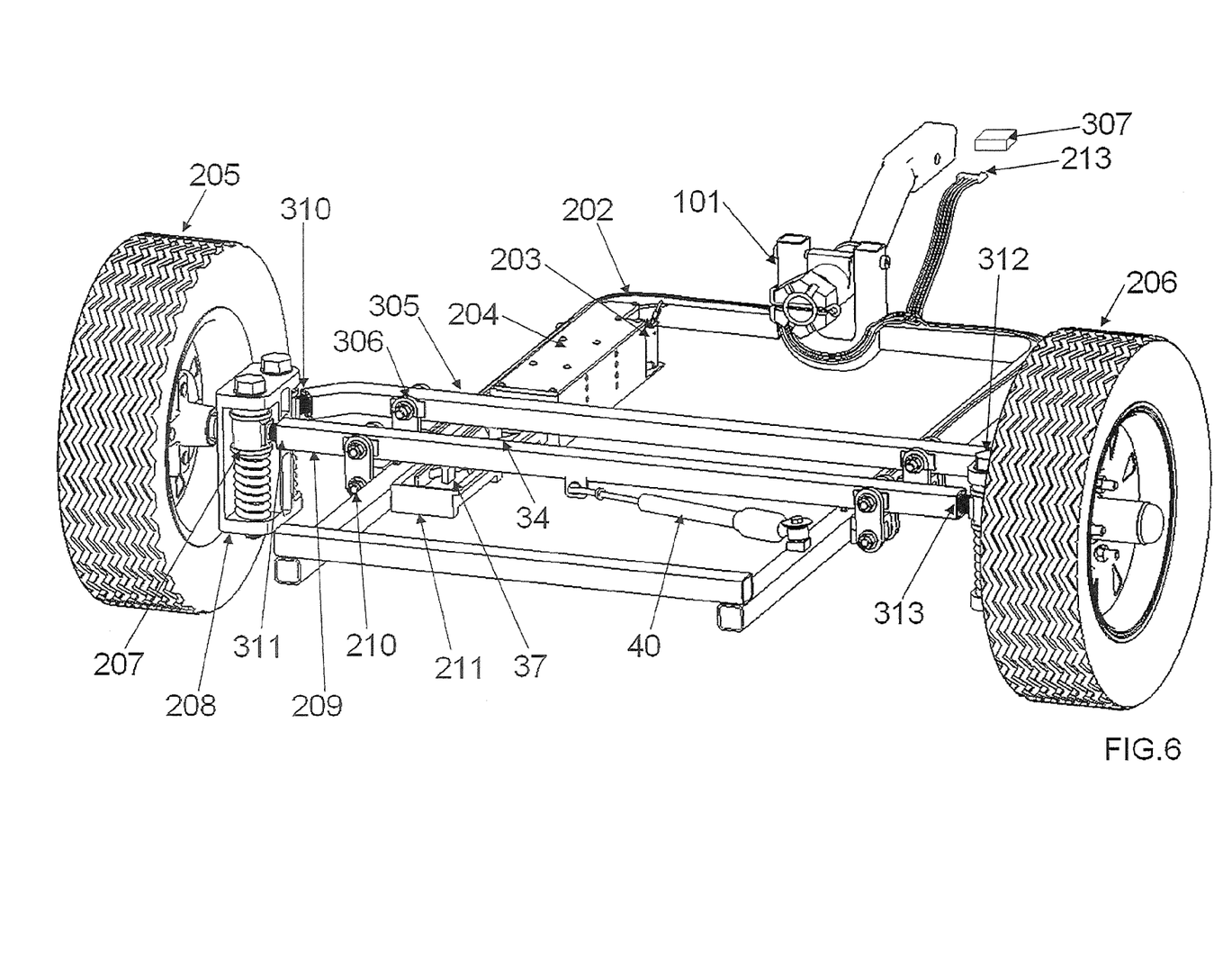
FIG. 6 is a perspective view which shows the general layout of the trailer steering components of the preferred embodiment of FIGS. 5A-5B.

In FIG. 6 the hitch assembly 101 is mounted to the front of the trailer frame 202. When the backup circuit is energized for many embodiments, the fifth wire, or other appropriate wire, of the wire harness 213 sends electrical energy from the reverse light wiring 307 of the vehicle 100 to the steering pump motor 203 located adjacent to the self contained steering pump/piston 204. The wiring 307 and the wire harness 213 are shown in further detail in FIG. 7, below. The standard wiring arrangement for a four prong trailer light plug may be supplemented by a fifth wire, which may be typically spliced into the supply wiring 307 for the backup lights on the towing vehicle 100 (further described with reference to FIG. 7, below).

In the forward configuration, the forward tie rod 305 is preferably held rigid laterally by the "Vee-block" steering actuator 211, which may be governed by the pump/piston 204. The forward tie rod 305 may be, supported by two hang rods 306 on either end which may also attach to the sides of the trailer frame 202. The forward hang rods 306 are preferably constrained to prevent forward or aft motion, but allow side to side motion. This accurately locates the forward tie rod 305 in the vertical and longitudinal directions and thus locates the subsequent assemblies. Other embodiments may be constructed differently.

Figure 8A:
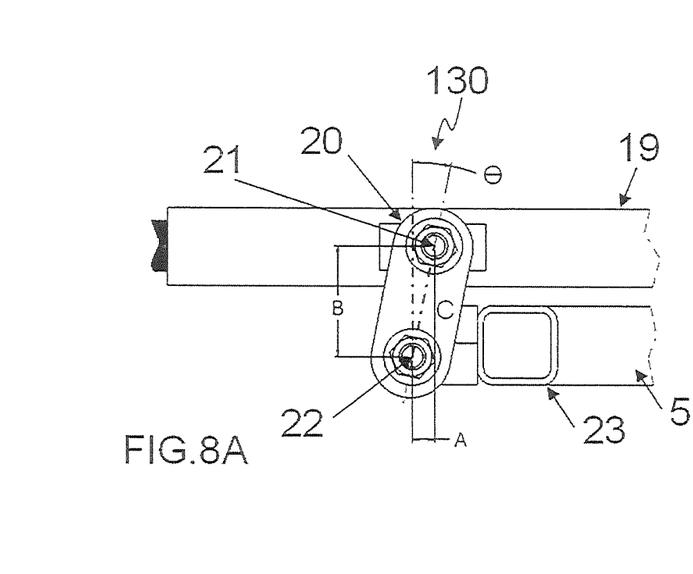
FIGS. 8A and 8B are detail rear plan views looking forward along the longitudinal axis of the trailer at the hang rod to trailer frame mount used with many embodiments. The views show the hang rod self-centering arrangement for the steering tie rods used with many embodiments.
Figure 8B:
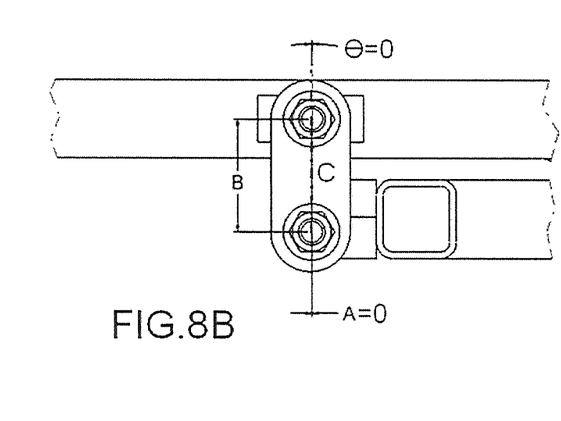

The hang rods 306 are preferably arranged such that the payload weight, which may be supported by the trailer frame 202 helps to center the steering system passively (further described in FIGS. 8A-8B). The forward tie rod 305 preferably has a bend at each end, initiating a slight amount of "toe" in the tire alignment at high speeds, which may stabilize the trailer (further described in FIG. 9).

At each end of the tie rod 305 may be mounted a rod end 207 through which the suspension block 208 and tire 105,106 are mounted. The rear tie rod 209 may also be attached to the suspension block 208 using rod ends 310,311,312,313 at each end and is also supported by two hang rods 210 at each end. The rear hang rods 210 are preferably allowed to swing both laterally and longitudinally to compensate for the reduced longitudinal distance between the two tie rods 209 due to the rotation (steering) of the tires and suspension blocks 208. Both tie rods 209 preferably have an integral tangs 37 and 34 which are used to engage the Vee-block (further described in FIGS. 10A-10F). A biasing system such as a spring loaded rod 40 may assist in returning the wheels back towards a straight aligned position relative to the frame or trailer frame 5 and/or parallel to the longitudinal (roll) axis 103.

Figure 7:
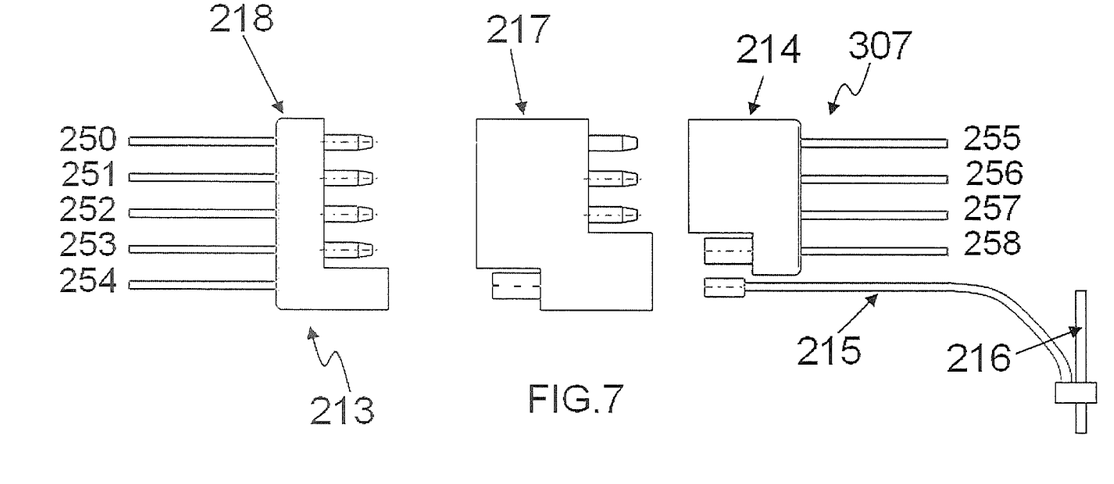
FIG. 7 is a wiring diagram between the towing vehicle and the trailer of the preferred embodiment of at least FIGS. 5 and 6, which depicts a preferred embodiment of a plug adaptor used to enable the steering pump motor for many embodiments.

FIG. 7 is an electrical schematic showing a standard four pin trailer plug 214 which is preferably mounted to the towing vehicle 100. In addition to the standard trailer wiring, an additional wire 215 may be spliced into the backup light supply wires 216 of the vehicle 100. This wire 215 may then be routed near to the standard four pin trailer plug 214 and permanently connected into a unique five pin trailer plug adaptor 217 for at least some embodiments. The five pin plug adaptor may be specifically designed to interface with an unaltered standard four pin trailer plug 214 and then receive the additional wire 215 described previously. The distinct advantage of this unique plug is the ability for the towing vehicle 100 to retain its ability to plug into any other standard four pin trailer by simply unplugging and securing the five pin plug adaptor 217. With the adaptor 217 installed the five pin trailer wiring connector 218 from the trailer 100 described herein may be connected, thus supplying the necessary electrical power to operate the trailer lights and steering pump motor 203. The trailer 120 may also, and probably will, have lights as well (not shown).

The traditional 5-pin trailer wiring connector 218 usually has white ground 250, brown running 251, yellow left turn 252, green right turn 253 and blue backup 254, but other connectors 218 with other colors, wire numbers and/or functions could be used with other embodiments. Four pin trailer plug 214 is shown with white ground 255, brown running 256, yellow left turn 257, green right turn 258. Backup light (blue) 215 has been spliced as shown from back up light wiring 216 to provide the additional wire. Adapter 217 then bridges the connections, but other systems of lighting could be employed with other embodiments.

FIGS. 8A-8B closely shows the geometrical relationship of the steering components of the trailer 101 of a preferred embodiment. In the left side of the view FIG. 8A the steering system 130 has deflected the tie rod 19 by a distance of (A) inches. The length of the hang rod 20 (illustrative of front or rear hang rod 306,210, respectively) is unchanging so a theoretical triangle may be described with the hypotenuse (C) of length equal to the hang rod between the upper mounting point 21 and the lower mounting point 22 on the trailer frame portion 23 of trailer frame 5. The lateral translation (A) swings the hang rod 20 through an angle θ and the resulting vertical distance (B) from the hang rod upper mount point 21 to the hang rod lower mount point 22 may be described as B=cosine (θ*C). Due to normal gravitational effects the trailer frame 5 will be drawn to its lowest point possible which would maximize the length B. It is therefore evident that the maximum length of B occurs when θ=0 degrees which is coincident to the point at which the steering is centered. Thus the hang rod arrangement preferably acts as a self centering member for the steering system 30 for at least some embodiments.

Figure 9:
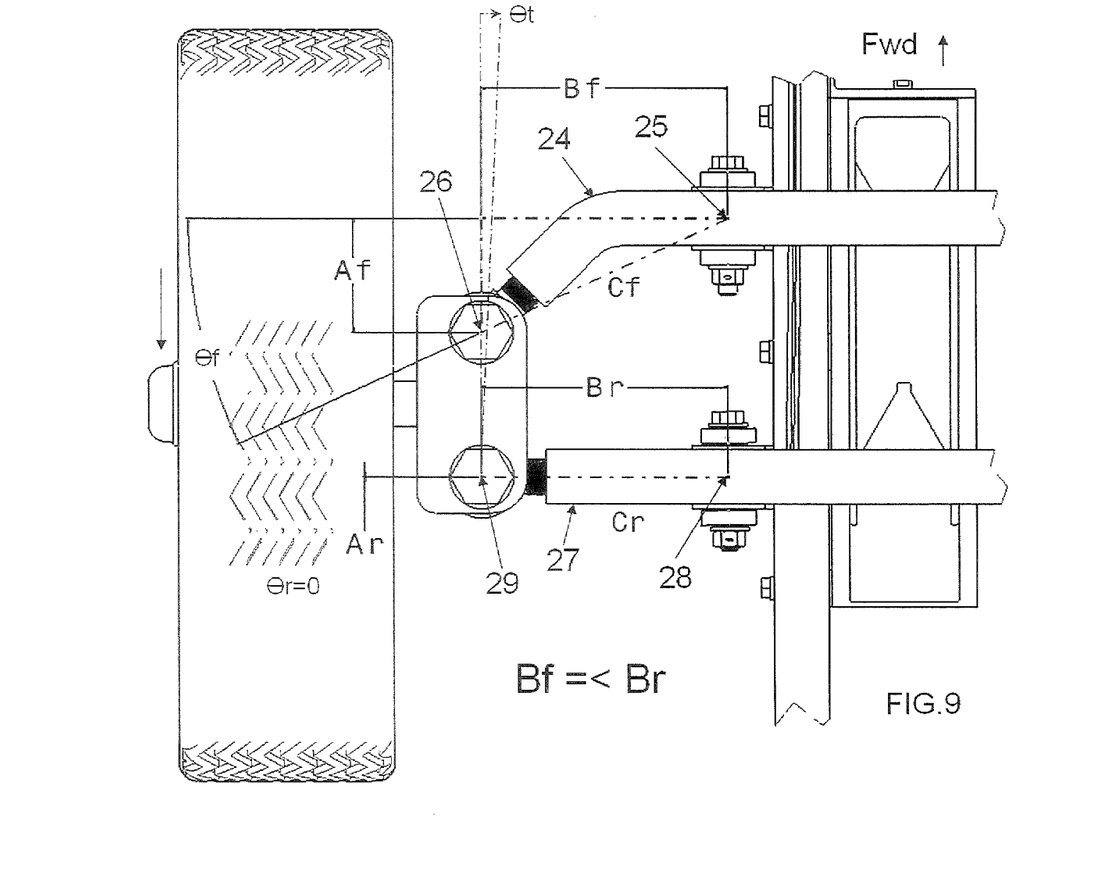
FIG. 9 is a top down view which shows the "toe-in" generating geometry of the forward and rear tie rods which may be used for at least some embodiments to help stabilize the trailer at highway speeds.
Figure 10A:
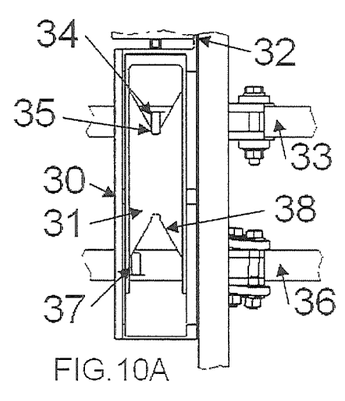
FIGS. 10A-10G are a series of bottom plan and partial detail views of the tie-rod to "Vee-Block" steering actuator interface used with many embodiments. This bottom upward view series depicts the motion of the Vee-block and the resulting constraints on motion of the forward and rear tie rod assemblies of many embodiments.
Figure 10B:
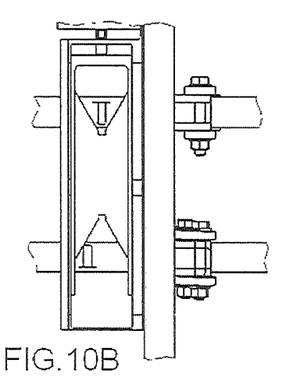
Figure 10C:
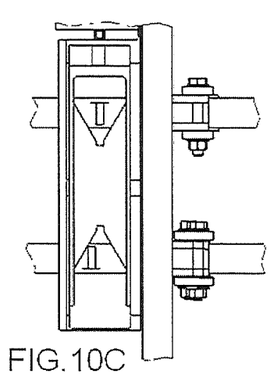
Figure 10D:
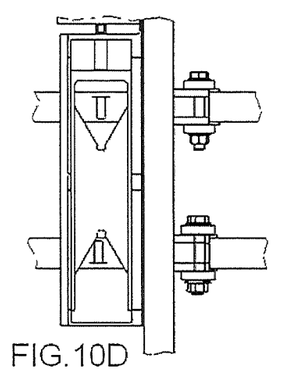
Figure 10E:
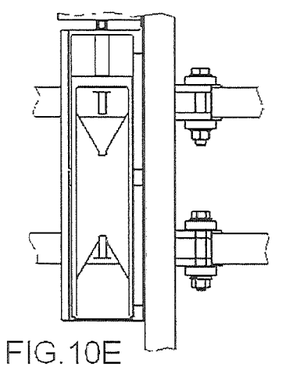
Figure 10F:
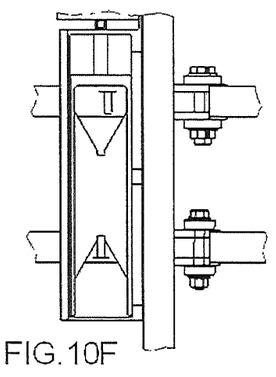
Figure 10G:
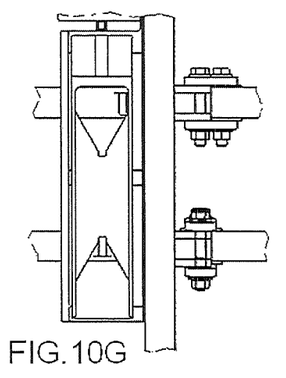

In FIG. 9 the forward tie rod assembly 24 may generate a natural angle $\theta_F$ between the forward tie rod mount point 25 and the suspension block forward mount point 26 with a constant distance $C_F$. This angle is increased as rearward forces are exerted during high speeds and increase the distance $A_F$ due to deflections of the forward tie rod. The lateral distance between the suspension block forward mount point 24 and the forward tie rod mount point 25 $B_F$ can be described as $B_F$=cosine ($\theta_F*C_F$). Meanwhile the rear tie rod assembly 27 generates a natural angle $\theta_R$ between the rear tie rod mount point 28 and the suspension block rear mount point 29 with a constant distance $C_R$. This angle may be nearly zero degrees when the vehicle is at rest and is increased as rearward forces are exerted during high speeds which increases the distance $A_R$, from its initial value of zero, due to deflections of the rear tie rod. The lateral distance between the suspension block rear mount point 26 and the rear tie rod mount point 25 $B_R$ can be described as $B_R$=cosine($\theta_R*C_R$). Since the initial geometry mandates that $\theta_F$ is a larger angle than $\theta_R$ the following relationship is obvious as the angles both increase due to rearward forces:

$$\text{Cosine}(\theta_F) = < \text{cosine}(\theta_R)$$

Thus:

$$B_F = < B_R$$

As $B_F$ decreases more quickly than $B_R$, the result is an ever increasing angle $\theta_T$. This angle coupled with the equal and opposite angle on the opposite side of the trailer 120 may create the "toe-in" effect as a function of vehicle/trailer speed.

The detail view series FIG. 10A-10F shows a presently preferred time sequence beginning with the Vee-Block steering actuator 31 in the forward position within its housing 30 as governed by the steering piston/pump 32. The interface tang 34 of the forward tie rod 33 may be constrained by the machined locking notch 35 in the Vee-Block. Meanwhile the rear tie rod 36 and its interface tang 37 are free to translate laterally within the confines of the continuously widening gap of the Vee-Block ramps 38. Image-A is the usual condition of the Vee-Block since the piston/pump 32 is normally retracted and thus this position secures the forward tie rod 33 and allows the rear tie rod 36 to act as a trailing link which allows the tires 205,206 to passively trail along and freely caster their steering angle as necessary. The left and right tire 205,206 are preferably constrained to stay at the same angle relative to each other, except for the speed related toe-in effect described herein yet they are free to passively steer as a pair.

During the transition from the forward drive configuration to the rearward drive configuration, images 10B through 10G depict the translation of the Vee-Block steering actuator 31 aft which simultaneously releases the forward tie rod interface tang 34 from the Vee-Block locking notch 35 while decreasing the clearance between the Vee-Block ramps 38 and the rear tie rod interface tang 37 until, finally, the tang 37 is driven toward the centerline of the Vee-Block ramps 38 and finally forced into the locking notch 35 on the rear segment of the Vee-Block. The forward tie rod 33, having been previously released from its locking notch 35 is now free to translate laterally within the confines of the continuously widening gap of the Vee-Block ramps 38 on the forward segment of the Vee-Block. The piston/pump 32, which is now extended, holds the Vee-Block in the rearward position and secures the rear tie rod 36 allowing the forward tie rod 33 to act as a trailing link for reverse direction travel which allows the tires 205,206 to passively trail along and freely caster their steering angle as necessary. The left and right tires 205,206 remain constrained to stay at the same angle relative to each other, except for the speed related toe-in effect described herein, which now functions to create a "toe-out" effect which in turn stabilizes the trailer while backing yet allows the tires to continue to be free to passively steer as a pair. Other embodiments utilize other structure of these features are employed.

Figure 11:
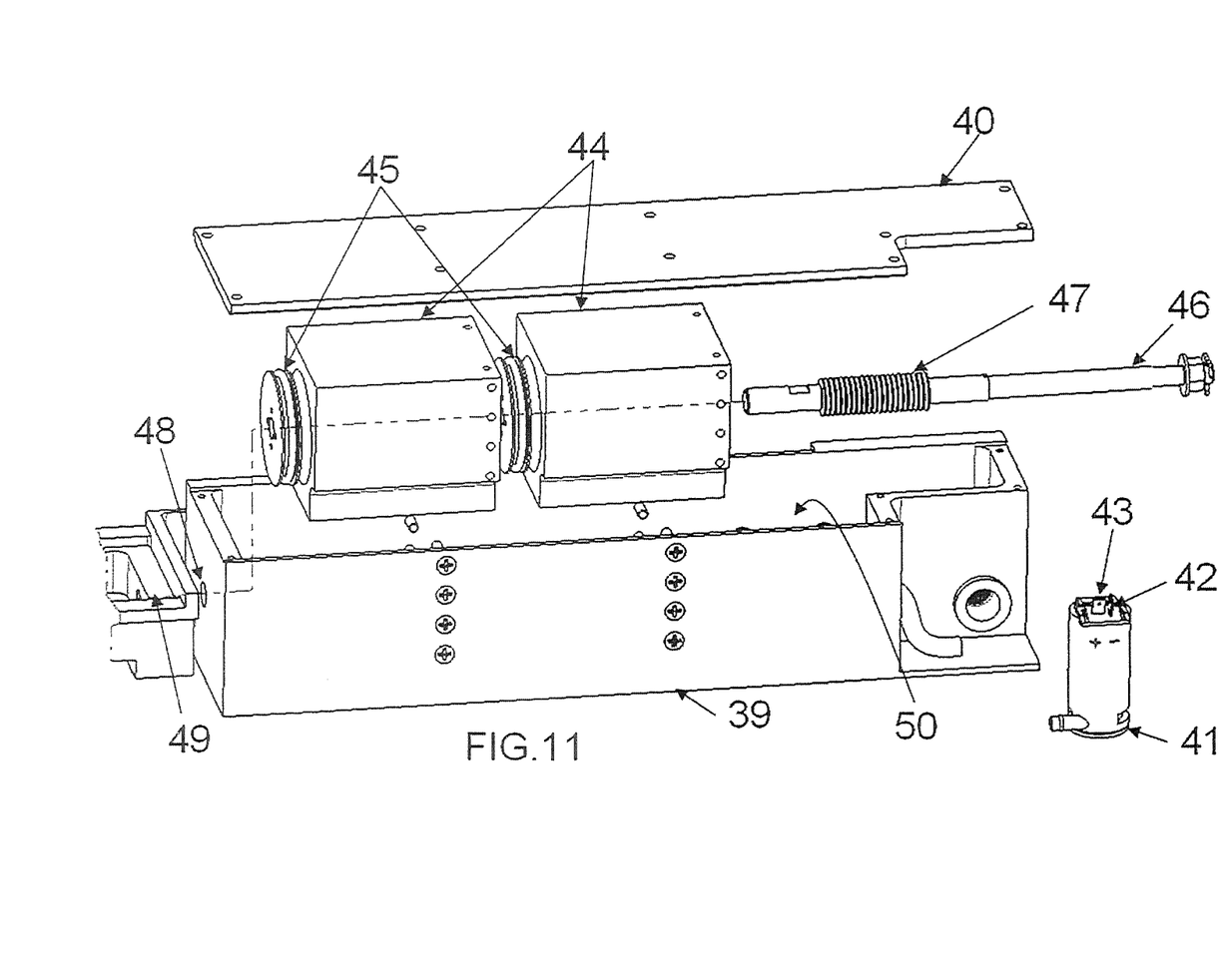
FIG. 11 is a partial exploded perspective view, showing the piston/pump and pump motor arrangement used with many embodiments.

In FIG. 11 the piston/pump housing 39, with its lid 40 removed, depicts a steering motor 41 with its negative electrical lead 42 grounded to the trailer body and the positive electrical lead 43 connected to the electrical supply wire on the trailer as described previously herein. This self contained fluid pump motor supplies a fluid force to the closed cavity created within the piston housing 44 (optional dual piston design shown) and behind the piston 45. The piston(s) 45 provide thrust to the piston rod 46, which after being loaded with return springs 47 is inserted through the piston housing (s) and piston(s) until it exits the piston/pump housing 45 through an o-ring sealed exit 48 and engages the Vee-Block steering actuator 49. Fluid pressure from the motor 41 forces the piston(s) 44 and attached piston rod rearward in the housing(s) until they reach their maximum extent and are mechanically limited. They will stay at this rearward position as long as fluid pressure is supplied by the pump motor 41, keeping the steering system in the passive rearward steering configuration. Other embodiments may be constructed differently.

When the towing vehicle 100 returns the gear selector from reverse to any other location, electrical power is switched off to the backup circuits within the vehicle 100. This loss of power consequentially stops the pump motor 41 at which time the springs 47 attached to the piston rod 46 may force the rod 46 forward. The motor 41 is consequentially designed to allow free "backflow" of the fluid from the piston chamber(s) through the motor 41 back into the reservoir 50 thus returning the Vee-Block to the passive forward steering configuration.

Thus there has been described a trailer passive steering system that significantly eases the skill required to back up by allowing the vertical pivot axis of the trailer to be locked and thus locating the trailer 120 always directly behind the towing vehicle 100 yet simultaneously allowing the tires 205,206 to freely caster their steering angle based on the motions of the towing vehicle 100, both in forward and reverse direction of travel.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A trailer for towing behind a vehicle comprising:
a hitch assembly for connecting to a receiver of a vehicle;
a frame connected to the hitch assembly; and
a steering system operably coupling the frame to left and right wheels, said steering system providing at least one of (a) wherein upon receipt of an electrical signal from a vehicle, the steering system changes from a forward drive configuration to a rearward drive configuration locking a tie in the rearward drive configuration; and (b) the steering system further comprising front and back tie rods connected at first and second pivots to the left and right wheels respectively and connected to the frame by hang rods, wherein the front tie rod is bent at a predetermined angle rearwardly toward the rear tie rod between the hang rod and the first pivot thereby contributing to a toe in effect of the wheels towards a centerline of the trailer as speed increases in a forward direction.

2. A trailer for towing behind a vehicle comprising:
a hitch assembly for connecting to a receiver of a vehicle;
a frame connected to the hitch assembly; and
a steering system operably coupling the frame to left and right wheels, said steering system providing at least one of (a) wherein upon receipt of an electrical signal from a vehicle, the steering system changes from a forward drive configuration to a rearward drive configuration locking a tie in the rearward drive configuration; and (b) the steering system further comprising front and back tie rods connected at first and second pivots to the left and right wheels respectively and connected to the frame by hang rods, wherein the front tie rod is bent at a predetermined angle rearwardly toward the rear tie rod between the hang rod and the first pivot thereby contributing to a toe in effect of the wheels towards a centerline of the trailer as speed increases in a forward direction;
wherein the steering system further comprises front, the back hang rods connected at first and second pivots to left and right wheels respectively with the front and back hang rods connected to the frame, and further comprising an actuator which selectively secures motion upon receipt of the electrical signal of a first of the front and back hang rods while allowing motion of a second of the front and back hang rod to selectively pick which of the first and second pivots the wheels rotate relative thereto along axes parallel to a yaw axis extending in an up and down relationship relative to the trailer.

3. A trailer for towing behind a vehicle comprising:
a hitch assembly for connecting to a receiver of a vehicle;
a frame connected to the hitch assembly; and a steering system operably coupling the frame to left and right wheels, said steering system providing at least one of (a) wherein upon receipt of an electrical signal from a vehicle, the steering system changes from a forward drive configuration to a rearward drive configuration locking a tie in the rearward drive configuration; and (b) the steering system further comprising front and back tie rods connected at first and second pivots to the left and right wheels respectively and connected to the frame by hang rods, wherein the front tie rod is bent at a predetermined angle rearwardly toward the rear tie rod between the hang rod and the first pivot thereby contributing to a toe in effect of the wheels towards a centerline of the trailer as speed increases in a forward direction;

a hitch assembly for connecting to a receiver of the vehicle;

said hitch assembly having a tang having a square cross section at one end and round cross section towards the second end, with the square cross section received within a hitch receiver of the vehicle and the round cross section received within a collar of the hitch assembly.

4. The trailer of claim 1 further comprising:

a hitch assembly for connecting to a receiver of the vehicle;

said hitch assembly having two independent axes of rotation: a roll axis defined along a longitudinal pivot axis extending front and back along a trailer; a pitch axis defined along a lateral pivot axis which is perpendicular to the longitudinal pivot axis and extends left and right relative to the trailer, whereby a yaw axis is defined along a vertical pivot axis which is perpendicular to both the lateral and longitudinal pivot axes extending up and down relative to the trailer; and rotation about the yaw axis is restrained from motion without limiting rotation about the other axes.

* * * * *